United States Patent [19]

Artaud et al.

[11] 4,348,354

[45] Sep. 7, 1982

[54] SEMI-MODULAR HEAT EXCHANGER FOR NUCLEAR REACTORS

[75] Inventors: Robert Artaud, Aix-en Provence; Michel Aubert, Manosque; Richard Elbeze, Aix-en Provence; Patrick Jogand, La Tour d'Aigues, all of France

[73] Assignee: Commissariat a l'Energie Atomique, France

[21] Appl. No.: 154,604

[22] Filed: May 30, 1980

[30] Foreign Application Priority Data

May 31, 1979 [FR] France ................................ 7914000

[51] Int. Cl.³ .......................... G21C 15/00; G21D 5/08
[52] U.S. Cl. ..................................... 376/405; 376/206
[58] Field of Search ..................... 176/60, 65; 165/140, 165/158; 376/405, 206

[56] References Cited

U.S. PATENT DOCUMENTS 4,120,348 10/1978 Pouderoux ........................... 176/65
4,173,997 11/1979 Andrews et al. ..................... 176/65

FOREIGN PATENT DOCUMENTS 2360057  2/1978  France .
2639658  6/1978  France .
2379881  9/1978  France .
2385067 10/1978  France .

Primary Examiner—Sal Cangialosi
Attorney, Agent, or Firm—Thomas J. Greer, Jr.

[57] ABSTRACT

Heat exchanger of a nuclear reactor, whose vessel is sealed by a slab, the exchanger being of the type which has within a vertically axed outer ferrule a plurality of heat exchange modules with substantially straight tubes, each of the said modules having a secondary fluid inlet chamber and a secondary fluid outlet chamber and means for introducing and removing the primary fluid with respect to the exchange modules, wherein it comprises a base plate peripherally fixed to the said outer ferrule, means for supporting the outer ferrule by the slab, supporting ferrules for the modules, each ferrule traversing the base plate and being connected on the one hand to the upper end of the module and on the other to the said base plate, a plurality of pipes for the supply and removal of the secondary fluid sealingly traversing the base plate, a supply manifold and a discharge manifold for the secondary fluid positioned within the outer ferrule above the base plate, said manifolds being respectively connected to the supply and discharge pipes of the secondary fluid, means for supporting the manifolds and a plurality of biological protection plates positioned within the outer ferrule above the base plate and level with the slab, said protection plates being supported by the manifold supporting means and permitting the passage of the secondary fluid and discharge pipes.

7 Claims, 7 Drawing Figures

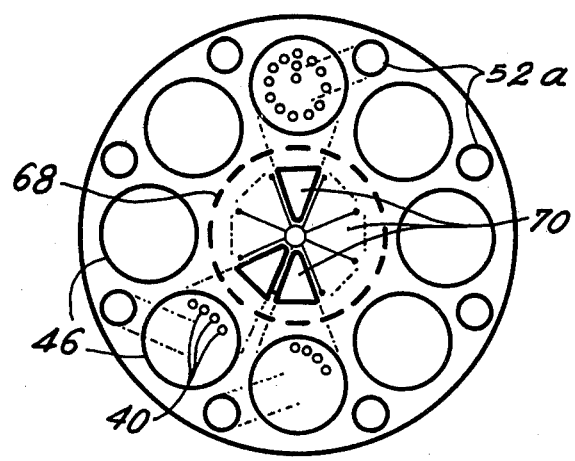
FIG. 3b
FIG. 3c
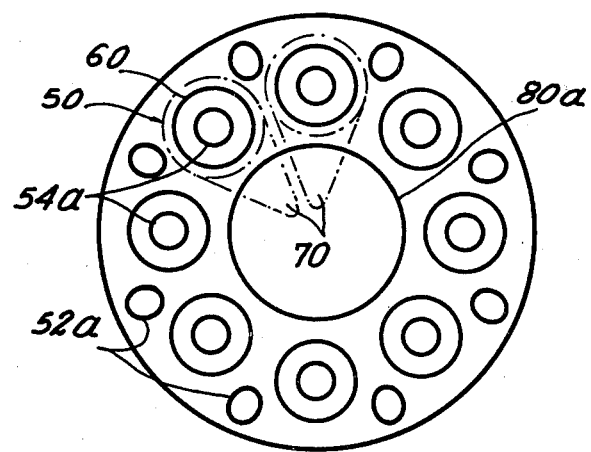

SEMI-MODULAR HEAT EXCHANGER FOR NUCLEAR REACTORS

BACKGROUND OF THE INVENTION

The present invention relates to a heat exchanger of the semi-modular type for a nuclear reactor and more particularly a fast neutron reactor cooled by a liquid metal and of the integrated type.

To provide a better understanding of the invention, FIG. 1 shows an integrated reactor in a vertical sectional view. It is possible to see in per se known manner a concrete block 2, whose upper part is sealed by the slab 4. The main vessel 6 containing the complete primary circuit is suspended on said slab 4 and is duplicated by a safety vessel 8.

Within the main vessel 6 there is an inner vessel 10 supported by a flooring 12 resting on the main vessel. The inner vessel separates on the one hand the hot liquid metal, generally sodium leaving the core 16 supported by the flooring and on the other hand the cold metal contained in the annular space 18 between the main vessel 6 and the inner vessel 10. In this type of reactor, the hot sodium leaving the core is taken up by pipes 19 which introduce the hot sodium leaving the core into intermediate exchangers 20. Pumps 22, also located in annular space 18 ensure the circulation of the primary fluid by reinjecting the liquid metal at the base of the core into support 14 by means of pipes 22b.

Nuclear reactors of this type using intermediate heat exchangers of the modular type are known. For example, reference is made to French Patent Application 77 08384 filed on Mar. 21, 1977 in the name of the present Applicant for an "annular heat exchanger" and the application for a certificate of addition EN 77 21451 filed on July 12, 1977 by the Applicant for an "annular heat exchanger".

BRIEF SUMMARY OF THE INVENTION

The present invention relates to a heat absorber able to absorb more easily than the prior art exchangers the thermal stresses which occur therein due to the temperature differences between the two fluids circulating in the exchanger.

The exchanger according to the invention is considered to be a semi-modular exchanger. Thus, it comprises a plurality of exchange modules having a common primary liquid metal supply and being mechanically interconnected.

Each module has a group of straight or substantially straight tubes. The term substantially straight indicates that the tubes can have over a portion of their length and particularly at their ends helical regions serving to give the tubes a greater flexibility.

The present invention relates to a heat exchanger of a nuclear reactor, whose vessel is sealed by a slab, the exchanger being of the type which has within a vertically axed outer ferrule a plurality of heat exchange modules with substantially straight tubes, each of the said modules having a secondary fluid inlet chamber and a secondary fluid outlet chamber and means for introducing and removing the primary fluid with respect to the exchange modules, wherein it comprises a base plate peripherally fixed to the said outer ferrule, means for supporting the outer ferrule by the slab, supporting ferrules for the modules, each ferrule traversing the base plate and being connected on the one hand to the upper end of a module and on the other to the said base plate, a plurality of pipes for the supply and removal of the secondary fluid sealingly traversing the base plate, a supply manifold and a discharge manifold for the secondary fluid positioned within the outer ferrule above the base plate, said manifolds being respectively connected to the supply and discharge pipes of the secondary fluid, means for supporting the manifolds and a plurality of biological protection plates positioned within the outer ferrule above the base plate and level with the slab, said protection plates being supported by the manifold supporting means and permitting the passage of the secondary fluid and discharge pipes.

According to a first constructional variant, the manifold supporting means comprise a supporting structure fixed by its lower end to the base plate.

According to a second variant, the manifold supporting means comprise a supporting plate, whose periphery is fixed to the outer ferrule level with the means for the supporting of said ferrule by the slab and a supporting structure fixed by its lower end to the supporting plate.

Preferably, the secondary fluid supply and discharge pipe portions between the base plate and the manifolds have a helical region forming an angle of approximately 180°. Thus, it is possible to absorb thermal expansions between the heat exchange modules and the "hot" and "cold" manifolds.

Preferably the discharge chambers are located in the upper part of the exchange modules and the secondary fluid discharge pipes are positioned internally and coaxially with respect to the supporting ferrules, the latter ensuring the sealed passage of the base plate through the secondary fluid discharge pipes.

It is therefore apparent that the ferrules have a double function. They firstly connect the modules to the base plate whilst ensuring the supporting thereof and on the other hand ensure the sealed passage of the base plate, which is necessary because the latter constitutes the base of the inert gas bell jar surmounting the primary fluid in the intermediate exchanger.

BRIEF DESCRIPTION OF THE DRAWINGS

The invention is described in greater detail hereinafter relative to non-limitative embodiments and the attached drawings, wherein show:

FIG. 2b a vertical sectional view of the lower part of the exchanger, whose upper part is shown in FIG. 2a.

FIGS. 3a to 3c cross-sectional views of the intermediate exchanger respectively according to planes A—A, B—B, C—C of FIG. 2b.

DETAILED DESCRIPTION OF THE PREFERRED EMBODIMENTS

Figure 1:
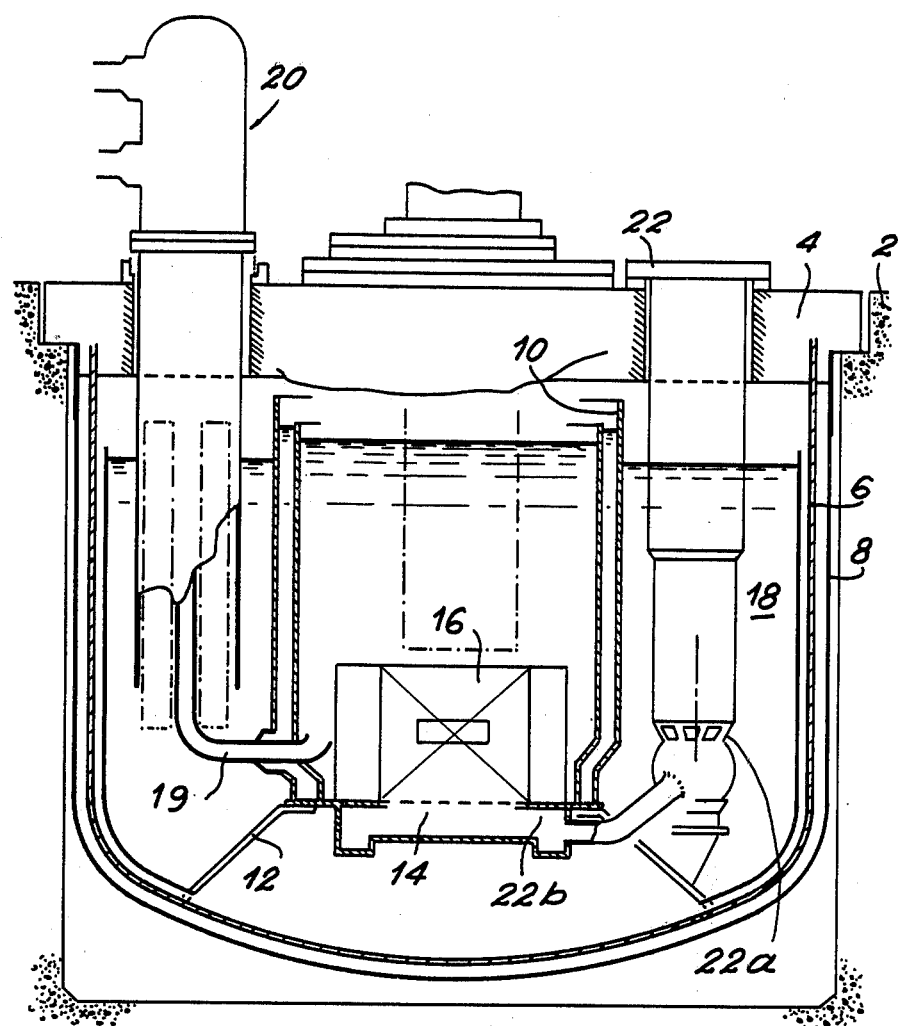
FIG. 1, which has already been described, a vertical sectional view of a fast neutron reactor of the integrated type showing the location of an intermediate exchanger.
Figure 2A:
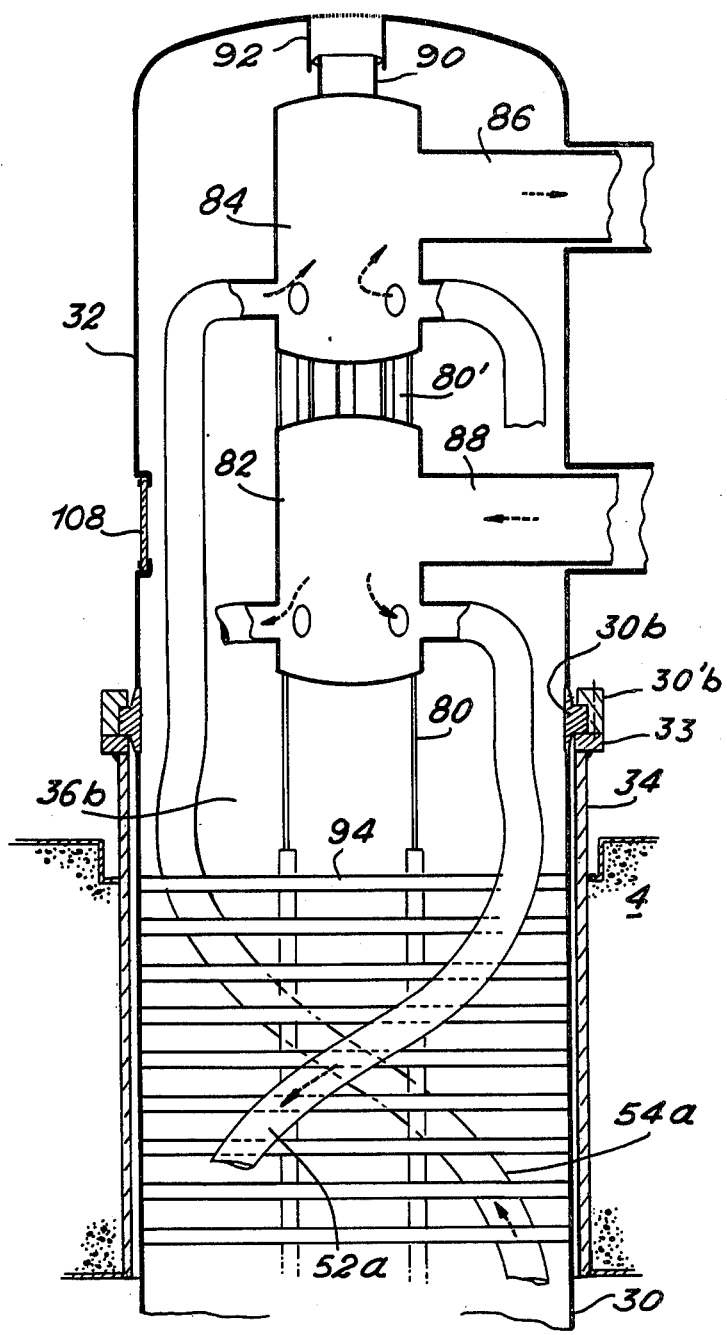
FIG. 2a a vertical sectional view of the upper part of the exchanger according to a first variant of the invention.
Figure 2B:
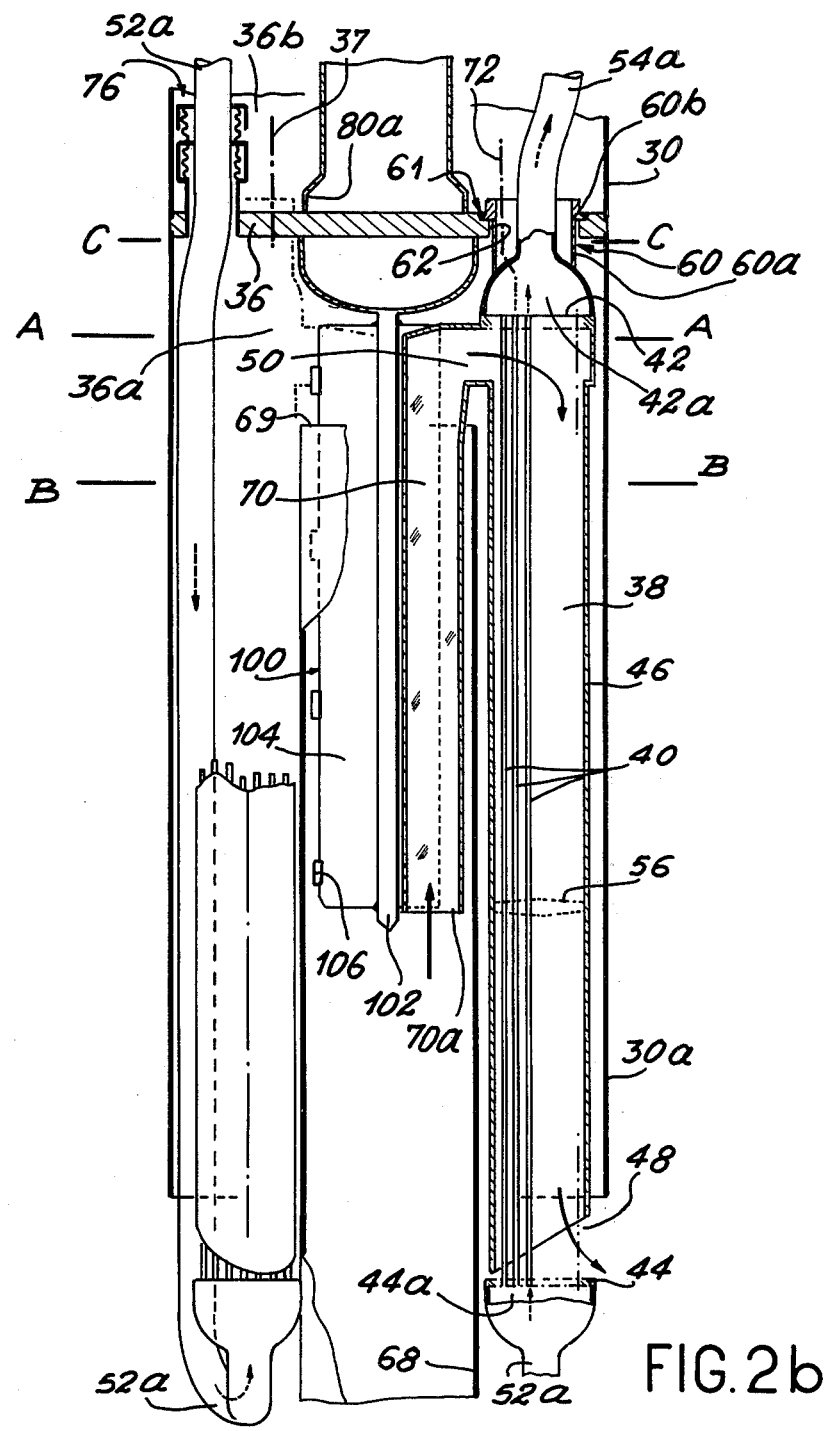

As is apparent from FIGS. 2a and 2b, the exchanger comprises an outer ferrule 30 open at its lower end 30a and provided at its upper end with a supporting flange 30b. This outer ferrule 30 is extended by an upper dome 32 connected to the ferrule. Flange 30b, which is held in place by an adaptor or counter-flange 30'b, bears on slab 4 by means of flange 33 and supporting sleeve 34. Thus, the assembly formed by ferrule 30 and dome 32 is supported by flange 30b, which bears on slab 4.

The inner space limited by ferrule 30 is subdivided by a horizontal base plate 36 into a lower space 36a and an upper space 36b. Diagrammatically, the lower space contains a heat exchange module such as 38, whilst the upper space contains the supply and discharge manifolds for the secondary fluid (liquid sodium) circulating in exchange modules 38. Each exchange module 38 comprises in per se known manner substantially straight exchange tubes 40 mounted between an upper tube plate 42 and a lower tube plate 44 respectively connected to discharge chamber 42a and supply chamber 44a. These exchange tubes are surrounded by an outer ferrule 46 having a lower discharge orifice 48 for the primary fluid and upper supply orifice 50 for the said primary fluid. The supply chamber 44a is connected to a supply pipe 52a, which will be described in greater detail hereinafter and the discharge chamber 42a is connected to a discharge pipe 54a, which will also be described in greater detail hereinafter. The structures which maintain in place the exchange tubes 40 of exchange modules 48 are symbolically indicated by the reference numeral 56.

According to an essential feature of the invention, each exchange module 38 is suspended by its upper part on the base plate 36. This suspension is advantageously realised by means of a supporting ferrule 60, whose lower end 60a is welded to the discharge chamber 42a and whose upper end 60b, which traverses plate 36 by a bore 62 is welded to a sleeve 62, itself fixed to the base plate 36. Thus, the exchange module is rigidly supported by the base plate. Obviously, the same applies with regard to the system of exchange modules of the intermediate exchanger. As can best be seen in FIG. 3c, the pipes 54a are located within the ferrules 60. In this way, the sealed crossing of base plate 36 by pipes 54a is realised.

The primary liquid metal is discharged from the exchange modules by lower orifices 48. The inflow of this primary liquid metal taken from the inner tank by pipes 19 is guided by the central shaft 68 of the intermediate exchanger. The individual feed-in pipes 70, whose upper portion is connected to the feed-in orifices 50 pass into said central shaft. As is apparent from FIGS. 3a and 3b, pipes 70 have a circular segment-shaped cross-section. In addition to supporting the exchange modules 38, base plate 36 constitutes the bottom of the inert gas bell jar laterally limited by the outer ferrule 30. The inner gas is for example argon. An argon tube 37 is used for introducing into the bottom of the bell jar an argon quantity such that for all reactor operating states, the two following conditions are satisfied:

the hot primary sodium level is constantly between the lower end 70a of pipe 70 and the upper end 69 of the central shaft 68 the cold primary sodium level (outside modules 38) is constantly above the edge of the lower end 30a of the outer ferrule 30.

In addition, pipes 72 permit the introduction of argon into the upper region of the intake orifice 50 of each module in order to possibly be able to stop the primary sodium supply of the module in question.

As can be gathered from FIG. 2b, pipes 52a have a curved portion and rise within the ferrule 30 parallel to the modules. The sealing of the crossing of pipes 52a through base plate 36 is ensured by metal expansion bellows 76 fixed on the one hand to base plate 36 and on the other to the outer wall of pipes 52a. Thus, the system of secondary sodium pipes 52a and 54a sealingly traverses the base plate 36, whilst permitting thermal expansions because none of the pipes is directly fixed to the base plate.

With reference to FIG. 2a, an explanation will be given of the way in which in said first variant of the invention, secondary liquid metal is supplied to and discharged from an exchange module.

A cylindrical supporting structure 80 fixed by its lower end 80a to the upper face of base plate 36 supports on the one hand a cold manifold 82 and on the other a hot manifold 84, which is disposed above the cold manifold 82. The hot secondary liquid metal discharge pipes 54a are connected by their upper end to the hot manifold 84. Pipes 52a are shaped like a portion of a helix forming an angle of 180° in the upper part of ferrule 30 and in dome 32. Thus, they can absorb part of the expansions of said pipes due to the temperatures occurring in the exchanger. The hot manifold is provided with a large hot secondary liquid metal discharge pipe 86 which passes to a steam generator, as is known in the case of fast neutron reactors cooled by liquid sodium. In the same way, the cold secondary liquid metal supply pipes 52a are connected to the cold manifold 82, whereby each forms within the ferrule 30 a helix corrresponding to an angle of 180°. In the same way, the cold manifold 82 is provided with a large cold secondary liquid metal supply pipe 88. Portion 80' of the central structure 80 ensures the mechanical connection between the cold and hot manifolds.

It is pointed out that the hot manifold is provided in its upper part with a guidance ferrule 90 which cooperates with a sleeve 92 fixed to the upper part of dome 32.

It is clear that level with the passage through the slab of the intermediate exchanger, there is an interruption in the biological protection provided by concrete slab 4. The continuity of the biological protection is ensured by a system of for example lead plates, such as 94 which are horizontal and fixed to the cylindrical supporting structure 80 in the constructional variant of FIG. 2a. Obviously, these plates have adequate channels to permit the passage of pipes 52a and 54a.

Figure 4:
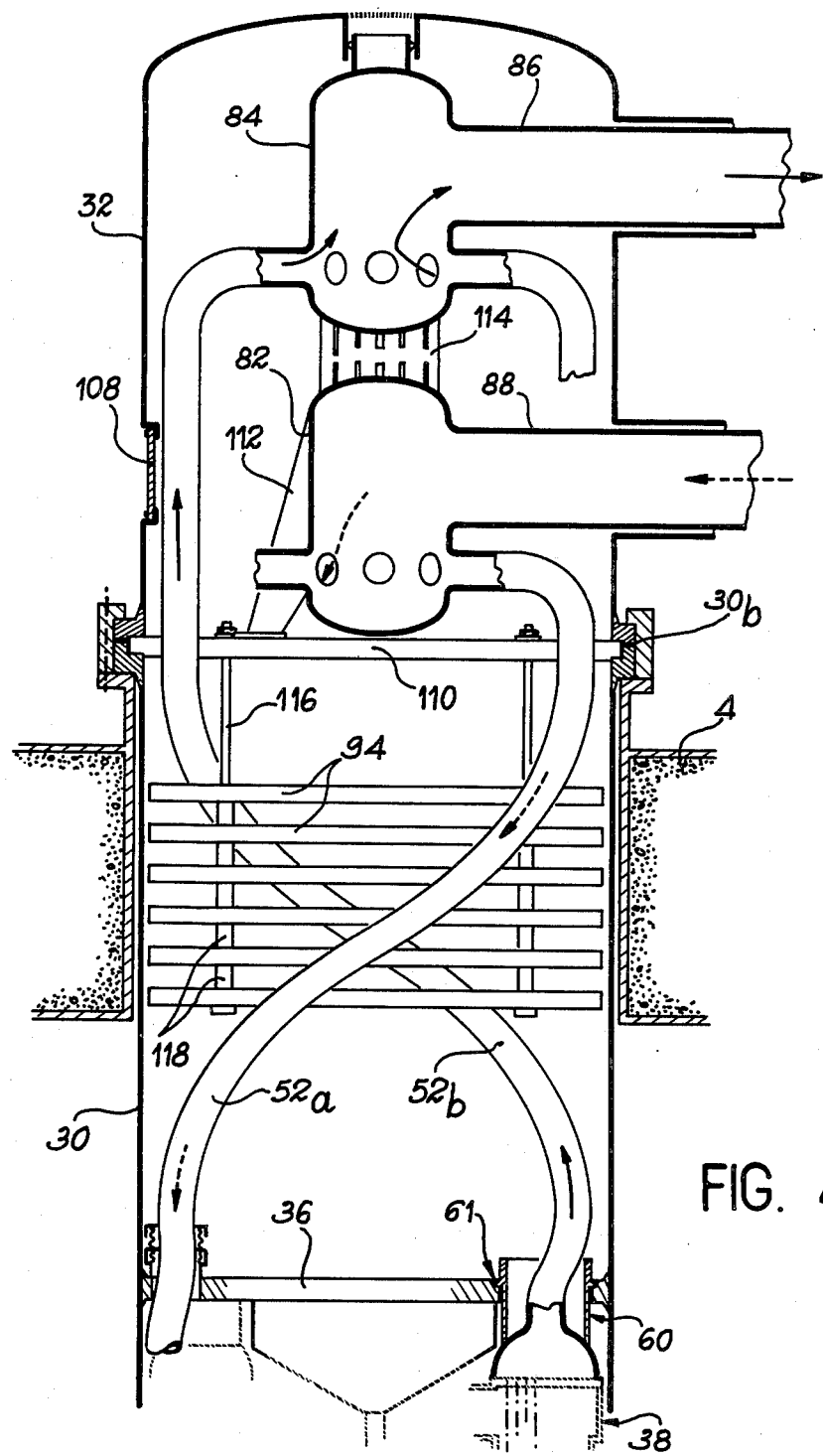
FIG. 4 a vertical sectional view of the upper part of the exchanger according to a second variant of the invention.

According to a second constructional variant shown in FIG. 4, the manifolds and the biological protection plates are no longer supported by the base plate 36, but by a support plate 110 positioned above plate 36 level with the supporting flange 30b. In this variant, the same reference numerals are used to designate the same elements as in the first variant.

As has been seen hereinbefore, in order to relieve the base plates 36, the supply manifold 82 and discharge manifold 84 are supported by a support plate 110 clamped between the two portions of the supporting flange 30b belonging to ferrule 30 and dome 32. More specifically, the supply manifold 82 rests on plate 110 by means of a support 112, whilst discharge manifold 84 is positioned above the supply manifold and rests on the latter by means of a central structure 114 similar to portion 80' in the variant of FIG. 2a.

Both the manifolds 82 and 84 are positioned above the support plate 110 and discharge manifold 84 is provided in its upper portion with a ferrule 90 received in a sleeve 92 fixed to the upper portion of dome 32.

As stated hereinbefore, the biological protection plates 94 are suspended on the support plate 110, for example by means of tie rods 116 equipped with appropriate spacers 118, the plates 94 being positioned level with the slab 4 and above base plate 36.

Obviously, the supply pipe 52a and discharge pipe 52b traverse appropriate channels formed in the support plate 110.

Figure 3A:
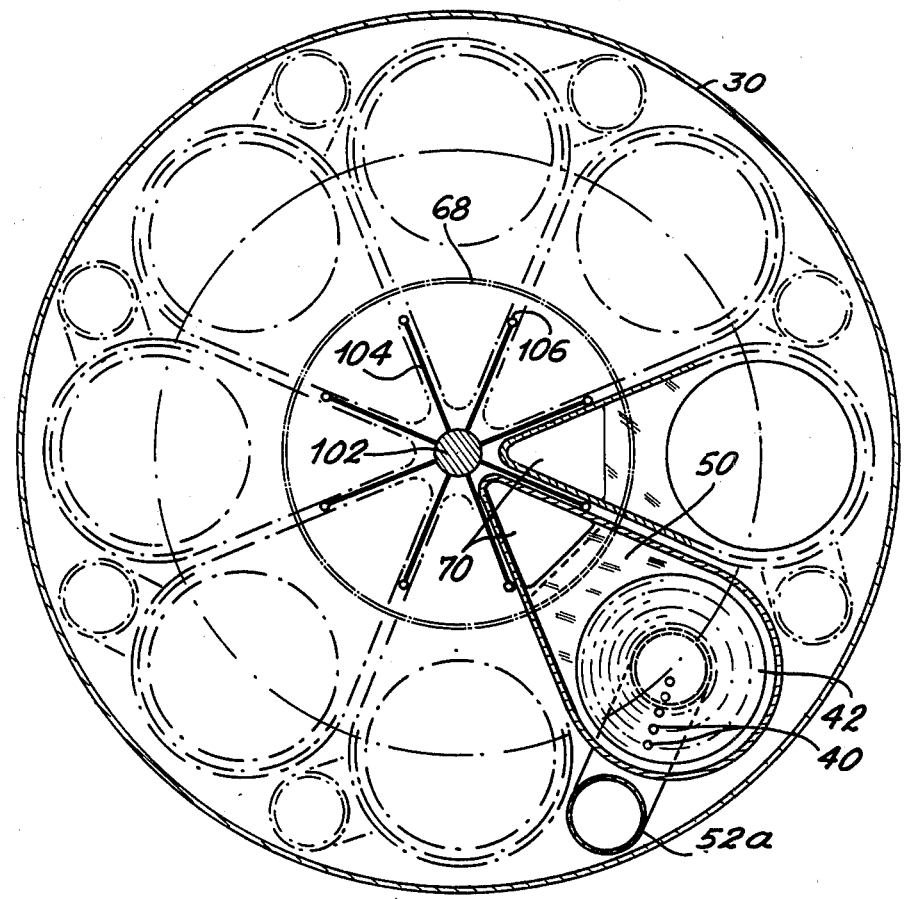

On referring to FIGS. 2b and 3a, it is apparent that the pipes 70 for supplying hot primary liquid metal into the exchange modules are maintained in place by a spacer system 100, which has a central rod 102 suspended below the base plate 36 and radial fins 104 by terminating by tubular portions 106 ensuring the mutual support of the feed-in pipes 70, thereby more particularly preventing vibrations of the latter.

Two cases of intervention on the exchanger will now be described. In the first case, an exchange module within the vessel is condemned.

The nuclear reactor is shut down and the liquid metal is removed from the secondary circuit. By means of a manhole 108 in dome 32 it is possible for an operator to enter the enclosure of the intermediate exchanger. A length of pipe 52a and a length of pipe 54a associated with the defective exchange module are cut away and then onto said pipes are welded plugs ensuring the condemning of the exchange module in question. The intermediate exchanger can then be started up again, which then functions with all its modules, with the exception of that which has been plugged.

The second intervention consists of the removal of an intermediate exchanger from the nuclear reactor vessel for maintenance purposes. To this end, the large pipes 86 and 88 are cut and the intermediate exchanger is extracted from the vessel by disassembling flange 30b. Outside the vessel, ferrule 30 is cut approximately 300 mm above the base plate 36. The pipes 52a and 54a are also cut. The weld of the supporting ferrule 60 on sleeve 61 fixed to base plate 36 is then ground, making it possible to set down module 38 which is to undergo maintenance.

It can be gathered from the above description of the semi-modular exchanger according to the invention that the latter has numerous advantages compared with the prior art exchangers. The thermal expansions of the supply and discharge secondary fluid pipes are better absorbed without complicating the structure. In addition, the exchanger has a better behaviour in the case of earthquakes to which the reactor may be exposed.

We claim:

1. In a nuclear reactor having a vessel sealed by a horizontally disposed slab, a heat exchanger comprising an outer ferrule disposed along and defining a vertical axis, said ferrule being provided at its upper end with a supporting flange which bears on said slab by means of a supporting sleeve, said ferrule being extended by an upper dome connected to the ferrule, a supply manifold and a discharge manifold for a secondary fluid, the manifolds being positioned within the upper dome, a plurality of heat exchange modules located within said ferrule, each said modules having substantially vertically disposed straight tubes opening in a secondary fluid inlet chamber and in a secondary fluid outlet chamber and orifices for introducing and removing a primary fluid with respect to each module, a plurality of supply pipes connecting said supply manifold to each inlet chamber, a plurality of discharge pipes connecting each outlet chamber with said discharge manifold, and a plurality of biological protection plates positioned within the outer ferrule level with said slab, wherein said heat exchanger further comprises at least one base plate peripherally fixed to said outer ferrule, each of said modules, said supply manifold and said discharge manifold, and said biological protection plates being connected to said outer ferrule by a single of said at least one base plate, each module being suspended to the corresponding base plate by a supporting ferrule traversing the latter and being connected on the one hand to the upper end of the module and on the other hand to the corresponding base plate, said supply pipes and said discharge pipes traversing said corresponding base plates through thermally expandible sealing means and having between said manifolds and said corresponding base plate portions which absorb thermal expansion of said pipes, whereby thermally induced mechanical stresses are reduced.

2. The nuclear reactor and heat exchanger according to claim 1, wherein a single base plate is provided below said slab, the said manifolds being connected to said base plate by a supporting structure fixed by its lower end onto said base plate.

3. The nuclear reactor and heat exchanger according to claim 1, wherein a second base plate is provided level with said supporting flange, the said manifolds being connected to said second base plate by a supporting structure fixed by its lower end to said second base plate.

4. The nuclear reactor and heat exchanger according to claim 1, wherein each said portions of the secondary fluid supply and discharge pipes is in the form of a helical part forming an angle of approximately 180°.

5. The nuclear reactor and heat exchanger according to claim 1, wherein the outlet chambers are positioned in the upper part of the exchange modules and the discharge pipes are positioned within and coaxially of the supporting ferrules, the latter ensuring the sealed passage of the base plate by the secondary fluid discharge pipes.

6. The nuclear reactor and heat exchanger according to claim 1, wherein said thermally expandible sealing means are expansion bellows.

7. The nuclear reactor and heat exchanger according to claim 1, wherein the discharge manifold is positioned above the supply manifold and has at its upper end an extension able to cooperate with a guidance member integral with said dome.

* * * * *